United States Patent
Beckham

[11] Patent Number: 5,826,764
[45] Date of Patent: Oct. 27, 1998

[54] EXTENSION BAR WITH GOLF BALL DISPENSER FOR HAND-DRAWN GOLF CARTS

[76] Inventor: Cedric E. Beckham, 639 Rawlins, Lancaster, Tex. 75146

[21] Appl. No.: 918,115

[22] Filed: Aug. 27, 1997

Related U.S. Application Data

[60] Provisional application No. 60/024,942 Aug. 8, 1996.

[51] Int. Cl.⁶ .................................................... B60R 11/00
[52] U.S. Cl. ......................... 224/274; 224/918; 224/919; 224/933; 206/315.1; 206/315.9; 248/98; 248/311.2; 221/185; 221/306
[58] Field of Search .................................... 224/400, 401, 224/274, 926, 933, 918, 919; 206/315.1, 315.3, 315.5, 315.9; 248/96, 97, 98, 311.2; 294/25; 280/43.315, 47.371; 221/185, 190, 303, 306

[56] References Cited

U.S. PATENT DOCUMENTS

| | | |
|---|---|---|
| 1,421,955 | 7/1922 | Kemp . |
| 2,709,027 | 5/1955 | Kozub . |
| 2,756,914 | 7/1956 | Bondever . |
| 2,780,508 | 2/1957 | Bondever .................................. 312/49 |
| 2,914,336 | 11/1959 | Hibben, Jr. et al. ............... 280/DIG. 6 |
| 2,950,748 | 8/1960 | Olenghouse .............................. 150/1.5 |
| 3,119,533 | 1/1964 | Kimes et al. . |
| 3,128,021 | 4/1964 | Habbena . |
| 3,733,086 | 5/1973 | Walkerson ........................... 280/47.17 |
| 4,550,930 | 11/1985 | Proffit ..................................... 224/274 |
| 4,784,305 | 11/1988 | Schoenberg .............................. 224/274 |
| 5,074,448 | 12/1991 | Wu .......................................... 224/274 |
| 5,435,474 | 7/1995 | Lin .......................................... 224/274 |
| 5,678,740 | 10/1997 | Wang ....................................... 224/274 |

*Primary Examiner*—Allan N. Shoap
*Assistant Examiner*—Gregory Vidovich
*Attorney, Agent, or Firm*—Joseph N. Breaux

[57] ABSTRACT

An extension bar for hand-drawn golf carts comprising an S-shaped bar member having a substantially rectangular cross-sectional shape and an upper and lower surface; a handle member attached to a first end of the S-shaped extension bar; an interconnect mechanism attached to a second end of the S-shaped handle, the interconnect mechanism including a clamp fitting having a curved contact surface, the clamp fitting being rotatably connected to a screw member; a score card holder assembly mounted to the upper surface of the S-shaped bar member having a score-card support surface, a clip mounted to the scorecard support surface for holding a golf score card and a hinged clear cover member pivotable into a first position covering the score card support surface; a plurality of tee holders positioned on the upper surface of the S-shaped bar member; and a golf ball dispensing assembly including a curved transparent ball chute mounted to the lower surface of the S-shaped member and having an insertion aperture for inserting golf balls into the ball chute and a dispensing aperture for dispensing balls from the ball chute, the dispensing aperture being blocked by a resilient dispensing flap being deflectable by a user to allow a golf ball to pass through the dispensing aperture and having sufficient resilience to return to a position blocking the dispensing aperture when released.

18 Claims, 3 Drawing Sheets ered by the numeral 10. Extension bar 10
EXTENSION BAR WITH GOLF BALL DISPENSER FOR HAND-DRAWN GOLF CARTS

TECHNICAL FIELD

This application claims the benefits under 35 U.S.C. 119(e) of earlier filed provisional application number 60/024,942, filed Aug. 30,1996. The present invention relates to golfing accessories and more particularly to an extension bar for hand-drawn golf carts having a golf ball dispenser for conveniently storing and dispensing a number of golf balls.

BACKGROUND OF INVENTION

Many golfers elect to use hand-drawn golf carts when golfing. These hand-drawn golf carts have a bag holding mechanism supported on a pair of wheels that holds the golfer's golf bag. The hand-drawn golf cart is drawn behind the player by a handle that extends from the bag holding mechanism. Although these hand-drawn golf carts work well, they are typically not equipped with any additional features to increase the golfer's enjoyment of his/her round of golf. It would be a benefit, therefore, to have an extension bar that could be attached to the existing handle of the hand-drawn golf cart that included a number of features intended to increase the golfer's enjoyment of the game.

SUNMARY OF INVENTION

It is thus an object of the invention to provide an extension bar for hand-drawn golf carts that is attachable to the existing handle of a hand-drawn golf cart and which includes a golf ball dispenser for holding and dispensing a number of golf balls.

It is a further object of the invention to provide an extension bar for hand-drawn golf carts which is attachable to the existing handle of a hand-drawn golf cart that includes a beverage holder.

It is a still further object of the invention to provide an extension bar for hand-drawn golf carts that is attachable to the existing handle of a hand-drawn golf cart which includes a score card holder.

It is a still further object of the invention to provide an extension bar for hand-drawn golf carts that accomplishes all or some of the above objects in combination.

Accordingly, an extension bar for hand-drawn golf carts is provided. The extension bar comprises an S-shaped bar member having a substantially rectangular cross-sectional shape and an upper and lower surface; a handle member attached to a first end of the S-shaped bar member; an interconnect mechanism attached to a second end of the S-shaped bar member, the interconnect mechanism including a clamp fitting having a curved contact surface, the clamp fitting being rotatably connected to a screw member; a score card holder assembly mounted to the upper surface of the S-shaped bar member having a scorecard support surface, a card holding clip mounted to the scorecard support surface for holding a golf score card, and a hinged, clear, cover member pivotable into a first position covering the scorecard support surface; a flexible golf glove holding strap assembly including a strap member, mounted at a first strap end to the S-shaped bar member, having a first section of hook and pile fastener secured to a second strap end thereof, and a second section of hook and pile fastener secured to the S-shaped bar member; a plurality of tee holders positioned on the upper surface of the S-shaped bar member; at least one beverage holder depression formed into a top surface of the interconnect mechanism; and a golf ball dispensing assembly including a curved transparent ball chute mounted to the lower surface of the S-shaped member and having an insertion aperture for inserting golf balls into the ball chute and a dispensing aperture for dispensing balls from the ball chute, the dispensing aperture being blocked by a resilient dispensing flap that is deflectable by a user to allow a golf ball to pass through the dispensing aperture and having sufficient resilience to return to a position blocking the dispensing aperture when released. The S-shaped bar member is preferably molded from plastic and includes at least one towel hook for attaching a towel near the handle.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
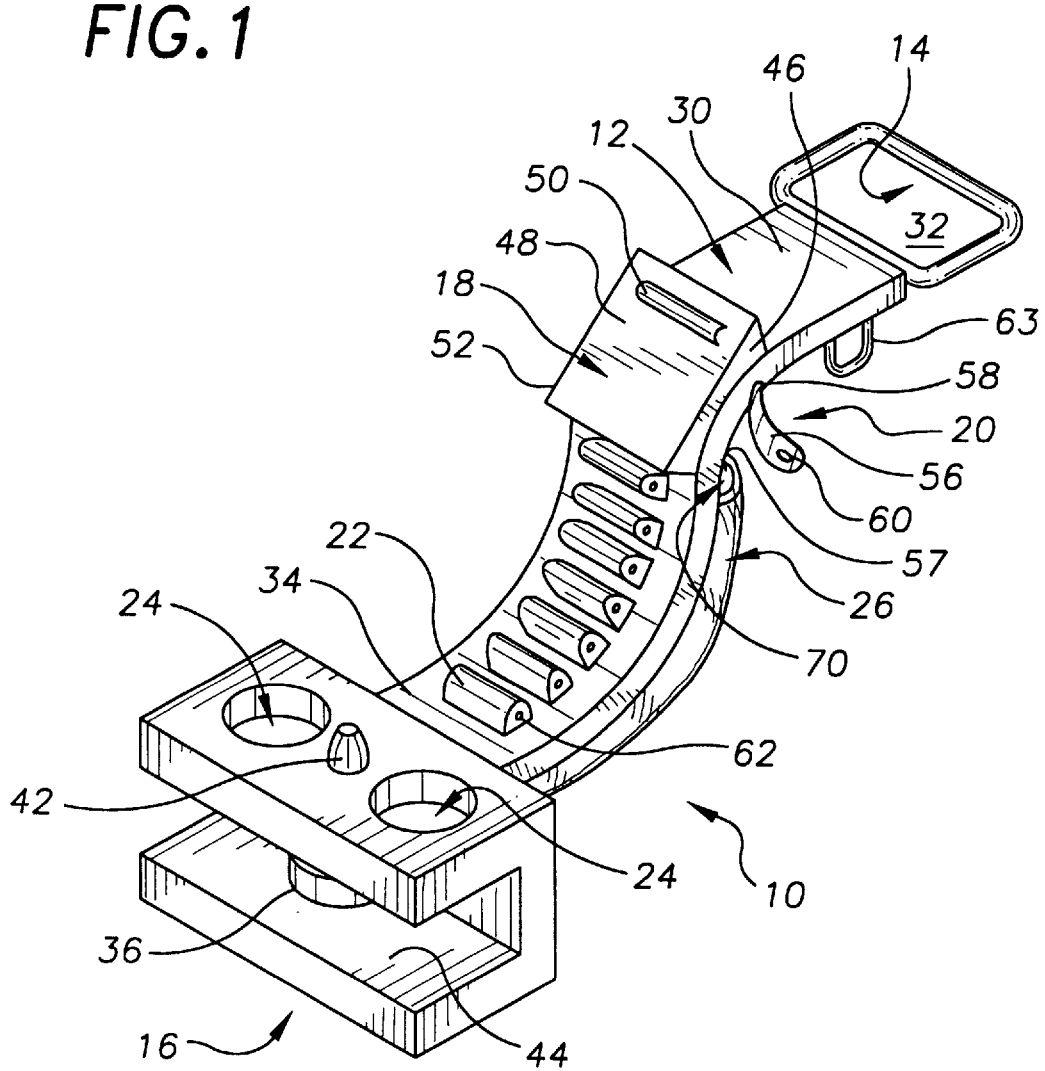
FIG. 1 is a perspective view of an exemplary embodiment of the extension bar for hand-drawn golf carts of the present invention showing the S-shaped bar member, the interconnect mechanism, the score card holder with hinged clear plastic cover, the flexible golf glove holding strap, the tee holders, the beverage holders, and the ball chute and insertion aperture of the golf ball dispensing assembly.

FIG. 1 shows an exemplary embodiment of the extension bar for hand-drawn golf carts of the present invention generally designated by the numeral 10. Extension bar 10 includes an S-shaped bar member, generally designated by the numeral 12; a handle member, generally designated by the numeral 14; an interconnect mechanism, generally designated by the numeral 16; a score card holder assembly, generally designated by the numeral 18; a flexible golf glove holding strap assembly, generally designated by the numeral 20; eight identical tee holders 22; two beverage holder depressions 24; and a golf ball dispensing assembly, generally designated by the numeral 26.

S-shaped bar member 12 is molded from plastic and has a substantially rectangular cross-sectional shape. Handle member 14 is integrally formed with a first end 30 of S-shaped bar member 30 and has a substantially rectangular shaped opening 32 for receiving the fingers of a user when handle 14 is grasped.

Interconnect mechanism 16 is also constructed from plastic and is integrally formed at a second end 34 of S-shaped bar member 12. Interconnect mechanism 16 includes a clamp fitting 36 having a curved contact surface 38 (FIG. 2) contoured to receive the existing handle of the hand-drawn golf cart. Clamp fitting 36 is rotatably connected to a screw member 40 (FIG. 2) having a knob 42 to allow screw member 40 to be tightened and loosened without additional tools. In use, the existing handle of a hand-drawn golf cart is placed beneath curved contact surface 38 of clamp fitting 36 and knob 42 rotated until clamp fitting 36 contacts and compresses the existing handle against a compression surface 44 provided beneath clamp fitting 36.

Score card holder assembly 18 is adhesively mounted to the upper surface of S-shaped bar member 12. Scorecard holder assembly 18 includes a scorecard support member 46 having a substantially planar support surface 48 (shown through a clear plastic cover), a card holding clip 50 riveted to planar support surface 48 along an upper edge thereof, and a clear plastic, cover member 52 connected to scorecard support member 46 with a hinge 54 (shown in FIG. 2). Clear plastic cover member 52 is pivotable into a first position covering planar support surface 48 and a second position allowing access to a scorecard placed on planar support surface 48 for score keeping.

Golf glove holding strap assembly 20 includes a strap member 56 and a second section of hook and pile fastener 57. Strap member 56 is riveted at a first strap end 58 to S-shaped bar member and is provided with a first section 60 of hook and pile fastener secured to a second strap end. First and second section 60,57 adhere to each other on contact allowing a pair of golf gloves to be placed between strap member 56 and S-shaped bar member 12 and held in place.

Figure 4:
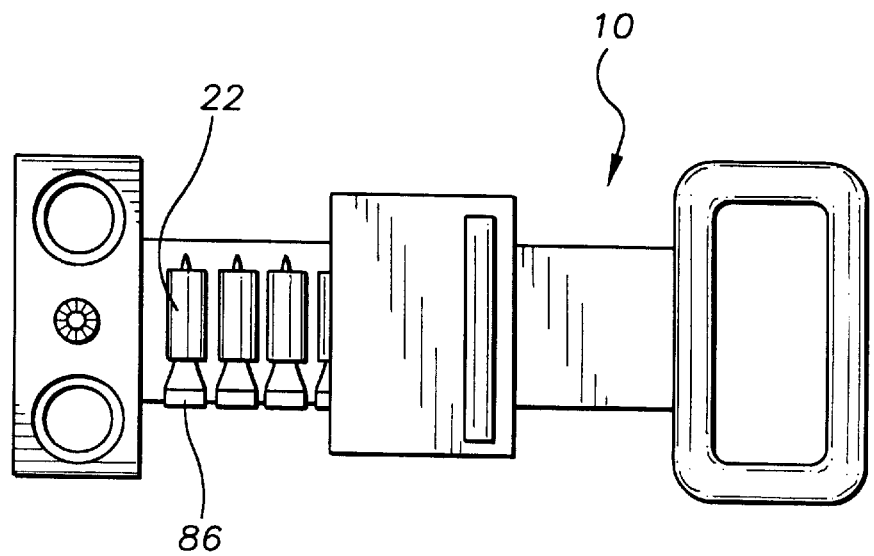
FIG. 4 is a top plan view of the exemplary extension bar of FIG. 1 showing the cup holders, a number of tee holders with golf tees inserted therein, the handle section, and the score card holder.

The eight tee holders 22 are integrally molded with the upper surface of S-shaped bar member 12. Each tee holder 22 includes a tee insertion passage 62 through which the pointed end of a golf tee is inserted. FIG. 4 shows tee holders 22 with representative golf tees 86 inserted therein available for retrieval when desired.

Beverage holder depressions 24 are formed into interconnect member 16 and are sized to receive a bottom portion of a standard twelve ounce beverage can. A towel hook 63 is also provided on S-shaped bar member 12 for attaching a towel if desired.

Figure 2:
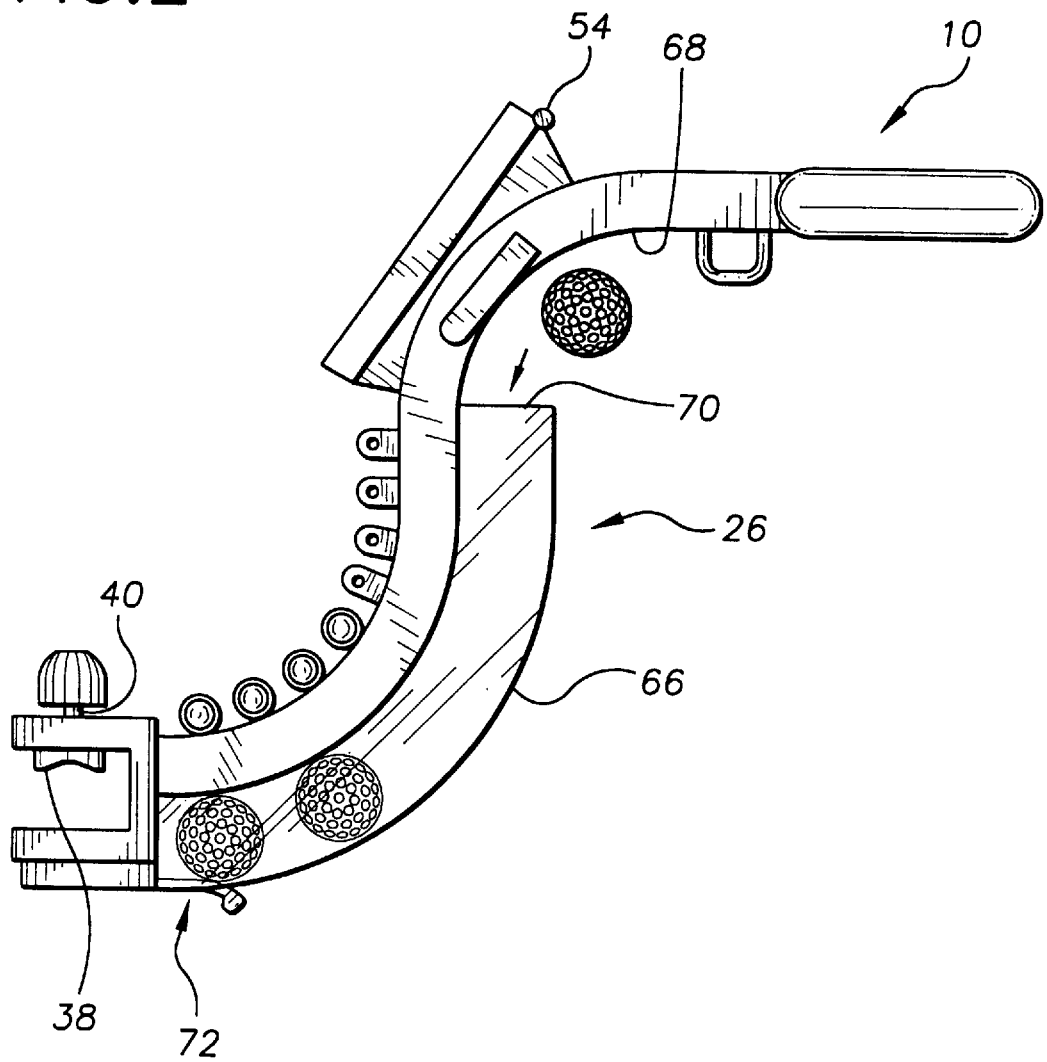
FIG. 2 is a side view of the exemplary extension bar of FIG. 1 showing the clamp fitting, and the resilient ball dispensing flap of the golf ball dispensing assembly.

With reference now to FIG. 2, golf ball dispensing assembly 26 includes a curved, transparent plastic ball chute 66 mounted to a lower surface 68 of S-shaped bar member 12. Ball chute 66 includes an insertion aperture 70 (shown in FIG. 1), sized to allow golf balls to be inserted therethrough into ball chute 66, and a dispensing aperture 72 (shown more clearly in FIG. 3) sized to allow golf balls to be dispensed therethrough from a bottom end of ball chute 66. Ball chute 66 is provided along the length thereof with a passageway sized to allow golf balls to travel from insertion aperture 70 to dispensing aperture 72.

Figure 3:
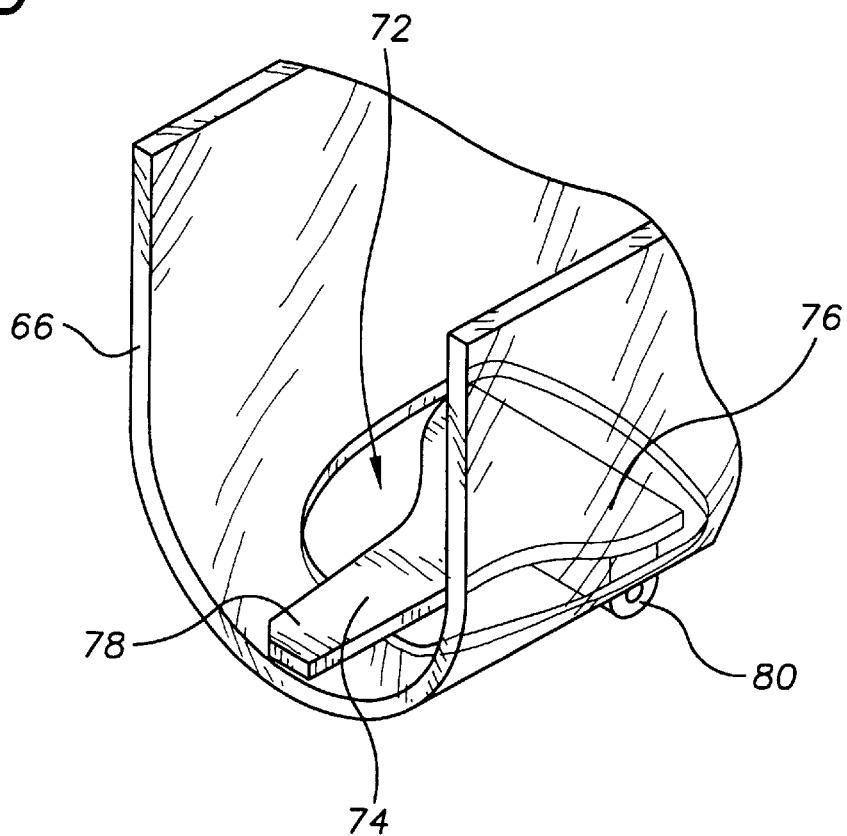
FIG. 3 is a detail perspective view of the dispensing flap positioned over the dispensing aperture of the golf ball dispensing assembly.

With reference to FIG. 3, golf balls within chute member 66 are prevented from exiting chute member 66 through dispensing aperture 72 by a resilient dispensing flap 74. Dispensing flap 74 is constructed from resilient rubber and includes a widened paddle section 76 that is positioned within dispensing aperture 72 to block passage of golf balls therethrough. An attachment portion 78 is adhesively secured to chute member 66 to hold resilient dispensing flap 74 in position. A tab portion 80 extends downwardly from a bottom surface of paddle section 76 to allow a user to easily deflect paddle section 76 out of dispensing aperture 72 when it is desired to retrieve a golf ball from chute member 66. Once tab portion is released, resilient forces move paddle section 76 back into blocking position within dispensing aperture 72.

Use of extension bar 10 is now described. Extension bar 10 is attached to an existing handle of a hand-drawn golf cart by positioning the existing handle beneath curved contact surface 38 of clamp fitting 36 and then rotating knob 42 until clamp fitting 36 contacts and compresses the existing handle against compression surface 44. Once extension bar 10 is secured to the existing hand-drawn golf cart, handle 14 of extension bar 10 is used instead of the existing cart handle to pull and guide the hand-drawn cart as desired. The elevated position of handle 14 with respect to the existing handle provides increased ergonomics. In addition, easy access to the various features of extension bar 10 provides increased enjoyment to the golfer.

It can be seen from the preceding description that an extension bar for hand-drawn golf carts has been provided that is attachable to the existing handle of a hand-drawn golf cart; that includes a golf ball dispenser for holding and dispensing a number of golf balls; that includes a beverage holder; and that includes a score card holder.

It is noted that the embodiment of the extension bar for hand-drawn golf carts described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An extension bar for hand-drawn golf carts comprising:

an S-shaped bar member having a substantially rectangular cross-sectional shape and an upper and lower surface;

a handle member attached to a first end of said S-shaped bar member;

an interconnect mechanism attached to a second end of said S-shaped bar member, said interconnect mechanism including a clamp fitting having a curved contact surface, said clamp fitting being rotatably connected to a screw member;

a flexible golf glove holding strap assembly including a strap member, mounted at a first strap end to said S-shaped bar member, having a first section of hook and pile fastener secured to a second strap end thereof, and a second section of hook and pile fastener secured to said S-shaped bar member; and a golf ball dispensing assembly including a curved transparent ball chute mounted to said lower surface of said S-shaped member and having an insertion aperture for inserting golf balls into said ball chute and a dispensing aperture for dispensing balls from said ball chute, said dispensing aperture being blocked by a resilient dispensing flap that is deflectable by a user to allow a golf ball to pass through said dispensing aperture and having sufficient resilience to return to a position blocking said dispensing aperture when released.

2. The extension bar of claim 1, wherein:

said S-shaped bar member is molded from plastic.

3. The extension bar of claim 1, wherein:

said S-shaped bar member includes at least one towel hook for attaching a towel near said handle.

4. The extension bar of claim 1 further including:

at least one beverage holder depression formed into a top surface of said interconnect mechanism.

5. The extension bar of claim 1 further including:

a plurality of tee holders positioned on said upper surface of said S-shaped bar member.

6. The extension bar of claim 1 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

7. The extension bar of claim 2, wherein:

said S-shaped bar member includes at least one towel hook for attaching a towel near said handle.

8. The extension bar of claim 2 further including:

at least one beverage holder depression formed into a top surface of said interconnect mechanism.

9. The extension bar of claim 2 further including:

a plurality of tee holders positioned on said upper surface of said S-shaped bar member.

10. The extension bar of claim 2 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

11. The extension bar of claim 7 further including:

at least one beverage holder depression formed into a top surface of said interconnect mechanism.

12. The extension bar of claim 7 further including:

a plurality of tee holders positioned on said upper surface of said S-shaped bar member.

13. The extension bar of claim 7 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

14. The extension bar of claim 11 further including:

a plurality of tee holders positioned on said upper surface of said S-shaped bar member.

15. The extension bar of claim 11 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

16. The extension bar of claim 14 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

17. The extension bar of claim 8 further including:

a plurality of tee holders positioned on said upper surface of said S-shaped bar member.

18. The extension bar of claim 8 further including:

a score card holder assembly mounted to said upper surface of said S-shaped bar member having a scorecard support surface, a card holding clip mounted to said scorecard support surface for holding a golf score card, and a hinged, clear, cover member pivotable into a first position covering said scorecard support surface.

* * * * *